United States Patent [19]

Kanayama et al.

[11] Patent Number: 5,213,890
[45] Date of Patent: May 25, 1993

[54] HEAT RESISTANT COMPOSITE FILM

[75] Inventors: Kaoru Kanayama; Noriko Okazaki, both of Ibaraki, Japan

[73] Assignee: Mitsubishi Petrochemical Co., Ltd., Tokyo, Japan

[21] Appl. No.: 746,996

[22] Filed: Aug. 19, 1991

[30] Foreign Application Priority Data

Aug. 21, 1990 [JP] Japan .................................. 2-219601

[51] Int. Cl.$^5$ .............................................. B32B 27/36
[52] U.S. Cl. ................................... 428/334; 428/412; 428/473.5; 428/474.4; 428/475.2; 428/480; 528/342; 528/345
[58] Field of Search ............... 428/473.5, 474.4, 475.2, 428/480, 412, 500, 334; 528/342, 345

[56] References Cited

PUBLICATIONS

Patent Abstracts of Japan, unexamined applications, C field, vol. 11, No. 290, Sep. 18, 1987 The Patent Office Japanese Government p. 103 C 447, *Kokai-No. 62-84 121 (Mitsubishi Petrochem. Co. Ltd.).
Database WPIL, abstract No. 90-160 714; Derwent Publications Ltd., London GB *Abstract* & JP-A-0-2-103 136 (Dainippon Printing K.K.) (Apr. 16, 1990).
Patent Abstracts of Japan, unexamined applications, C field, vol. 14, No. 555, Dec. 10, 1990 The Patent Office Japanese Government p. 100 c 786, *Kokai-No. 02-23-8-023 (Mitsubishi Petrochem. Co. Ltd.)*.

*Primary Examiner*—Paul J. Thibodeau
*Assistant Examiner*—D. S. Nakarani
*Attorney, Agent, or Firm*—Oblon, Spivak, McClelland, Maier & Neustadt

[57] ABSTRACT

A heat resistant composite film is described, which comprises (I) a thermoplastic film and (II) a cured layer of a thermosetting resin composition comprising (A) 100 parts by weight of an aliphatic diamine having a spiroacetal ring, (B) from 5 to 150 parts by weight of an ester derived from maleic acid and an alcohol represented by formula (I), and (C) from 20 to 250 parts by weight of an ester derived from a tetracarboxylic acid and an alcohol represented by formula (I),

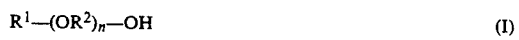

wherein $R^1$ represents an alkyl group having from 1 to 4 carbon atoms; $R^2$ represents an alkylene group having from 2 to 4 carbon atoms; and n represents 0 or an integer of from 1 to 3. The composite film is resistant to temperatures of 150° C. or higher while exhibiting flexibility.

6 Claims, No Drawings

HEAT RESISTANT COMPOSITE FILM

FIELD OF THE INVENTION

This invention relates to a composite film having excellent heat resistance useful in wide applications, such as flexible bases for printing, chip carrier tapes, film condensers, parting films, and wrapping materials.

BACKGROUND OF THE INVENTION

Flexible printing bases or magnetic tapes are usually made of polyester resins, but their use in high temperatures has been confined within very narrow limits due to poor heat resistance. Polyimide films are known to have heat resistance but are not suited for general purposes due to expensiveness. Tapes comprising a film of polyester, etc. coated with an epoxy resin which are now under study have problems waiting for solutions in terms of flexibility and heat resistance.

SUMMARY OF THE INVENTION

An object of the present invention is to provide a heat resistant film which withstands use in high temperatures of 150° C. or higher while retaining flexibility for general purposes.

The present invention relates to a heat resistant composite film composed of a thermoplastic film and a cured layer of a thermosetting resin composition comprising (A) 100 parts by weight of an aliphatic diamine having a spiroacetal ring, (B) from 5 to 150 parts by weight of an ester derived from maleic acid and an alcohol represented by formula (I), and (C) from 20 to 250 parts by weight of an ester derived from a tetracarboxylic acid and an alcohol represented by formula (I),

$$R^1-(OR^2)_n-OH \qquad (I)$$

wherein $R^1$ represents an alkyl group having from 1 to 4 carbon atoms; $R^2$ represents an alkylene group having from 2 to 4 carbon atoms; and n represents 0 or an integer of from 1 to 3.

DETAILED DESCRIPTION OF THE INVENTION

The thermoplastic film which can be used in the present invention is not restricted at all, and any of known films of thermoplastic resins is employable. Examples of the thermoplastic resins are polyester resins, polyolefin resins, e.g., polyethylene and polypropylene, and engineering plastics, e.g., polyether ether ketone and polyphenylene sulfide. Preferred of them are polyester films because of excellent chemical strength, excellent solvent resistance, and moderate stiffness.

The aliphatic diamine having a spiroacetal ring as component (A) of the thermosetting resin composition preferably includes those represented by formula:

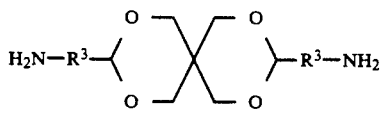

wherein $R^3$ represents an alkylene group having from 1 to 8 carbon atoms.

Specific examples of such aliphatic diamines are 3,9-bis(3-aminopropyl)-2,4,8,10-tetraoxaspiro[5,5]undecane, 3,9-bis(3-aminoethyl)-2,4,8,10-tetraoxaspiro[5,5]undecane, 3,9-bis(3-aminobutyl)-2,4,8,10-tetraoxaspiro[5,5]undecane, and 3,9-bis(3-aminocapryl)-2,4,8,10-tetraoxaspiro[5,5]undecane.

Components (B) and (C) are esterification products between an alcohol represented by formula (I) and maleic anhydride or a tetracarboxylic acid, respectively. The degree of esterification of components (B) and (C) is at least 50%.

The alcohols of formula (I) include those wherein n is 0, e.g., methyl alcohol and ethyl alcohol; and those wherein n is from 1 to 3, e.g., methyl cellosolve, ethyl cellosolve, butyl cellosolve, and carbitol.

The tetracarboxylic acid to be used in the synthesis of component (C) includes dianhydrides of pyromellitic acid, biphenyltetracarboxylic acid, and 3,3',4,4'-benzophenonetetracarboxylic acid.

The ester as components (B) or (C) can easily be obtained by reacting an alcohol of formula (I) with at most an equimolar amount of maleic anhydride or at most half the molar amount of a tetracarboxylic acid anhydride, respectively, to provide 50% or more esterified product of these acids, under heating at a temperature of from 60° to 150° C. with stirring for a period of from 10 minutes to 1 hour.

The composite film of the present invention can generally be produced by dissolving the above-mentioned thermosetting resin composition and, if desired, a curing accelerator in an organic solvent, coating the solution on a thermoplastic film, drying the solution, and heating the solution to cure the thermosetting resin composition.

Suitable organic solvents for dissolving the thermosetting resin composition include alcohols, such as those represented by formula (I); ketones, e.g., acetone and methyl ethyl ketone; ethers, e.g., dimethyl ether, diethyl ether, and di-n-propyl ether; halogenated hydrocarbons, e.g., dichloroethane and chloroform; hydrocarbons, e.g., toluene; and N,N-dimethylformamide. Preferred of them are alcohols of formula (I). From the standpoint of workability and reactivity, it is preferable that the alcohol of formula (I) is used in excess in the synthesis of component (B) or (C), and the excess alcohol is used as such as a solvent for dissolving the thermosetting resin composition. For better workability, the solvent is preferably used in such an amount that the resulting solution has a solids content of from 10 to 90% by weight. The solids content of the solution is adjusted to control the viscosity and thereby to control the thickness of the coating layer.

The solution containing components (A), (B), and (C) is then coated on the thermoplastic film, dried, and cured to obtain the heat resistant composite film according to the present invention. If desired, the solution may contain a curing accelerator.

Examples of useful curing accelerators include tertiary amines, e.g., triethylamine and benzyldimethylamine; peroxides, e.g., di-tert-butyl peroxide, dicumyl peroxide, and cumene hydroperoxide; and azobisisobutyronitrile.

Coating of the thermosetting resin solution is conducted by dip coating, casting, bar coating, screen coating, or the like means.

Drying is carried out usually at a temperature of from 50° to 200° C., and preferably from 80° to 150° C., for 10 minutes to 2 hours, while these conditions vary depending on the solvent used.

Curing can be effected in an oven, etc. in air or, in some cases, nitrogen at a temperature of from 150° to 230° C., and preferably from 180° to 230° C., for 1 to 10 hours, and preferably from 2 to 5 hours.

The composite film according to the present invention is composed of the thermoplastic film having laminated on one or both sides thereof a cured layer of the thermosetting resin composition.

The thickness of the thermoplastic film, while not being limited, usually ranges from 25 to 100 μm. The thickness of the cured layer of the thermosetting resin composition, while not being limited, preferably ranges from 5 to 100 μm. If it is less than 5 μm, the effect of improving heat resistance is reduced. If it exceeds 100 μm, flexibility of the resulting composite film is reduced.

The composite film according to the present invention finds use as such in broad applications, for example, as chip carrier tapes, film condensers, parting films, and wrapping materials. Further, the composite film in its B stage (semi-curing state) can be used as a hot melt tape. Furthermore, the composite film may be adhered on a copper foil while in its B stage for use as a flexible printing base.

The present invention is now illustrated in greater detail with reference to Examples, but it should be understood that the present invention is not deemed to be limited thereto. All the percents are by weight unless otherwise indicated.

EXAMPLE 1

A mixture of 4.64 g of maleic anhydride monocarbitol ester, 9.92 g of pyromellitic acid dicarbitol ester, and 8.22 g of 3,9-bis(3-aminopropyl)-2,4,8,10-tetraoxaspiro[5,5]undecane was dissolved in 22.78 g of carbitol to prepare a solution having a resinous content of 50%.

The solution was cast on a 50 μm thick polyester film having been subjected to a corona discharge by bar coating using an automatic coating apparatus manufactured by Tester Sangyo K. K. and dried at 150° C. for 20 minutes to form a resin layer having a thickness of 10 μm. The same resin layer was then formed on the other side of the polyester film. The layer was then heated at 200° C. for 5 hours to obtain a composite film having on both sides thereof a yellow brown cured layer of the thermosetting resin.

Characteristics of the resulting composite film are shown in Table 1 below.

EXAMPLE 2

A mixture of 4.64 g of maleic anhydride monocarbitol ester, 11.22 g of biphenyltetracarboxylic acid dicarbitol ester, and 8.22 g of 3,9-bis(3-aminopropyl)-2,4,8,10-tetraoxaspiro[5,5]undecane was dissolved in 24.08 g of carbitol to prepare a solution having a resinous content of 50%.

A composite film having on both sides thereof a yellow brown cured layer of a thermosetting resin was prepared in the same manner as in Example 1, except for using the above-prepared solution.

Characteristics of the resulting composite film are shown in Table 1.

EXAMPLE 3

A mixture of 4.64 g of maleic anhydride monocarbitol ester, 11.8 g of 3,3',4,4'-benzophenonetetracarboxylic acid dicarbitol ester, and 8.22 g of 3,9-bis(3-aminopropyl)-2,4,8,10-tetraoxaspiro[5,5]undecane was dissolved in 24.66 g of carbitol to prepare a solution having a resinous content of 50%.

A composite film having on both sides thereof a yellow brown cured layer of a thermosetting resin was prepared in the same manner as in Example 1, except for using the above-prepared solution.

Characteristics of the resulting composite film are shown in Table 1.

EXAMPLE 4

A mixture of 4.64 g of maleic anhydride monocarbitol ester, 11.8 g of 3,3',4,4'-benzophenonetetracarboxylic acid dicarbitol ester, and 8.22 g of 3,9-bis(3-aminopropyl)-2,4,8,10-tetraoxaspiro[5,5]undecane was dissolved in 24.66 g of carbitol to prepare a solution having a resinous content of 50%.

The solution was cast on a 50 μm thick polypropylene film having been subjected to a corona discharge in the same manner as in Example 1 and dried at 120° C. for 30 minutes to form a resin layer having a thickness of 10 μm. The same resin layer was then formed on the other side of the polypropylene film. The layer was then heated at 150° C. for 5 hours to obtain a composite film having on both sides thereof a yellow brown cured layer of the thermosetting resin.

Characteristics of the resulting composite film are shown in Table 1.

EXAMPLE 5

A mixture of 4.64 g of maleic anhydride monocarbitol ester, 11.8 g of 3,3',4,4'-benzophenonetetracarboxylic acid dicarbitol ester, and 8.22 g of 3,9-bis(3-aminopropyl)-2,4,8,10-tetraoxaspiro[ 5,5]undecane was dissolved in 24.66 g of carbitol to prepare a solution having a resinous content of 50%.

The solution was cast on a 50 μm thick polycarbonate film having been subjected to a corona discharge in the same manner as in Example 1 and dried at 150° C. for 20 minutes to form a resin layer having a thickness of 10 μm. The same resin layer was then formed on the other side of the polycarbonate film. The layer was then heated at 250° C. for 5 hours to obtain a composite film having on both sides thereof a yellow brown cured layer of the thermosetting resin.

Characteristics of the resulting composite film are shown in Table 1.

REFERENCE EXAMPLES 1 TO 3

The polyester film used in Examples 1 to 3, the polypropylene film used in Example 4, and the polycarbonate film used in Example 5 were evaluated, and the results obtained are shown in Table 1.

TABLE 1

| | Example 1 | Example 2 | Example 3 | Example 4 | Example 5 | Reference Example 1 | Reference Example 2 | Reference Example 3 |
|---|---|---|---|---|---|---|---|---|
| Flexibility | Good | Very good | Very good | Very good | Very good | Very good | Very good | Very good |
| Glass transition temperature[*1] (°C.) | 192 | 178 | 172 | 150 | 196 | 30 | 80 | 130 |

TABLE 1-continued

|   | Example 1 | Example 2 | Example 3 | Example 4 | Example 5 | Reference Example 1 | Reference Example 2 | Reference Example 3 |
|---|---|---|---|---|---|---|---|---|
| Shrinkage*2 (%): | | | | | | | | |
| 200° C. × 1 hr | 0 | 0 | 0 | 0 | 0 | 4 | — (fused) | 2 |
| 230° C. × 1 hr | 2 | 2 | 4 | 2 | 1 | 8 | — | 6 |
| Heat resistance in soldering (260° C. × 2 min) | Good | Good | Good | Good | Good | Poor (fused) | Poor (fused) | Poor (fused) |

Note:
*1: Measured by thermo-mechanical analysis (TMA) (5° C./min) using a probe.
*2: Shrinkage in the machine direction of a 2 cm × 2 cm square sample film cut from a roll film.

While the invention has been described in detail and with reference to specific examples thereof, it will be apparent to one skilled in the art that various changes and modifications can be made therein without departing from the spirit and scope thereof.

What is claimed is:

1. A heat resistant composite film composed of a thermoplastic film having provided on both sides thereof a cured layer of a thermosetting resin composition comprising (A) 100 parts by weight of an aliphatic diamine having a spiroacetal ring, (B) from 5 to 150 parts by weight of an ester derived from maleic acid and an alcohol represented by formula (I), and (C) from 20 to 250 parts by weight of an ester derived from a tetracarboxylic acid and an alcohol represented by formula (I), $$R^1-(OR^2)_n-OH \quad (I)$$

wherein $R^1$ represents an alkyl group having from 1 to 4 carbon atoms; $R^2$ represents an alkylene group having from 2 to 4 carbon atoms and n represents an integer of from 1 to 3.

2. A heat resistant composite film as claimed in claim 1, wherein said aliphatic diamine is represented by formula:

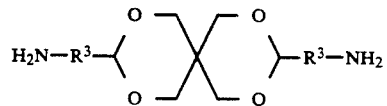

wherein $R^3$ represents an alkylene group having from 1 to 8 carbon atoms.

3. A heat resistant composite film as claimed in claim 1, wherein the degree of esterification of said components (B) and (C) is at least 50%.

4. A heat resistant composite film as claimed in claim 1, wherein said thermoplastic film is selected from the group consisting of a polyester film, a polyolefin film and a polycarbonate film.

5. A heat resistant composite film as claimed in claim 4, wherein said thermoplastic film is a polyester film.

6. A heat resistant composite film as claimed in claim 1, wherein said cured layer has a thickness of 5 to 100 μm.

* * * * *